United States Patent
Centonza et al.

(10) Patent No.: US 10,292,062 B2
(45) Date of Patent: May 14, 2019

(54) RESOURCE ALLOCATION AMONGST PARTIES SHARING THE SAME RADIO ACCESS NETWORK

(71) Applicant: Telefonaktiebolaget L M Ericsson (Publ), Stockholm (SE)

(72) Inventors: Angelo Centonza, Winchester (GB); Mats Buchmayer, Stockholm (SE); Icaro L. J. DaSilva, Sollentuna (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 44 days.

(21) Appl. No.: 14/439,428

(22) PCT Filed: Jan. 29, 2015

(86) PCT No.: PCT/SE2015/050101
§ 371 (c)(1),
(2) Date: Apr. 29, 2015

(87) PCT Pub. No.: WO2015/115987
PCT Pub. Date: Aug. 6, 2015

(65) Prior Publication Data
US 2016/0044702 A1    Feb. 11, 2016

Related U.S. Application Data

(60) Provisional application No. 61/934,231, filed on Jan. 31, 2014.

(51) Int. Cl.
| H04W 24/08 | (2009.01) |
| H04W 16/14 | (2009.01) |
| H04W 24/10 | (2009.01) |

(52) U.S. Cl.
CPC ......... *H04W 24/08* (2013.01); *H04W 16/14* (2013.01); *H04W 24/10* (2013.01)

(58) Field of Classification Search
CPC .................. H04L 16/14; H04W 76/023
See application file for complete search history.

(56) References Cited

U.S. PATENT DOCUMENTS

2007/0249339 A1 * 10/2007 Tamura ............... H04L 12/5695
                                                                    455/433
2010/0039978 A1    2/2010 Rangan
(Continued)

FOREIGN PATENT DOCUMENTS

| GB | 2490968 A    | 11/2012 |
| WO | 2013163745 A1 | 11/2013 |

OTHER PUBLICATIONS

International Search Report and Written Opinion dated Jun. 26, 2015 for International Application No. PCT/SE2015/050101, International Filing Date Jan. 29, 2015 consisting of 10 pages.
(Continued)

*Primary Examiner* — James P Duffy
(74) *Attorney, Agent, or Firm* — Christopher & Weisberg, P.A.

(57) ABSTRACT

A method and apparatus for allocating resources of a cell served by a base station among a plurality of operators sharing the cell resources are disclosed. One embodiment is a method including receiving from a central node serving at least the base station, a resource allocation request instructing the base station to reallocate the cell resources among the plurality of operators. The method further includes allocating cell resources among the plurality of operators according to the resource allocation request received from the central node.

23 Claims, 12 Drawing Sheets

(56) References Cited

U.S. PATENT DOCUMENTS

| | | | |
|---|---|---|---|
| 2013/0143542 A1 | 6/2013 | Kovvali et al. | |
| 2013/0301609 A1* | 11/2013 | Smith | H04W 72/0493 370/331 |
| 2013/0303114 A1* | 11/2013 | Ahmad | H04W 16/14 455/406 |
| 2014/0148165 A1* | 5/2014 | Serravalle | H04W 16/14 455/436 |

OTHER PUBLICATIONS

3GPP TS 32425 V12.0.0 (Jun. 2013) 3rd Generation Partnership Project; Technical Specification Group Services and System Aspects; Telecommunication management; Performance Management (PM); Performance Measurements Evolved Universal Terrestrial Radio Access Network (E-UTRAN) (Release 12) Jun. 27, 2013 consisting of 74-pages.
3GPP TSG-RAN Meeting #62, R1-132089, Source: NEC, Bell Canada. e-Access, InterDigital, Orange, Softbank, Sprint, Telefonica, Telenor, TeliaSonera Title: "Proposed SI: RAN Aspects of RAN Sharing Enhancements for LTE", (Acronym: RSE-RAN_LTE-Core), Document for Approval, Conference Location and Date: Busan, Korea, Dec. 3-6, 2013 consisting of 6-pages.
3GPP TS 36.413 V12.0.0 (Dec. 2013) 3rd Generation Partnership Project; Technical Specification Group Radio Access Network; Evolved Universal Terrestrial Radio Access Network (E-UTRAN); S1 Application Protocol (S1AP) (Release 12) Dec. 17, 2013 consisting of 278-pages.
3GPP TS 36.423 V12.0.0 (Dec. 2013) 3rd Generation Partnership Project; Technical Specification Group Radio Access Network; Evolved Universal Terrestrial Radio Access Network (E-UTRAN); X2 Application Protocol (X2AP) (Release 12) Dec. 19, 2013 consisting of 144-pages.
3GPP TS 22101 V131.0 (Dec. 2013) 3rd Generation Partnership Project; Technical Specification Group Services and System Aspects; Service Aspects; Service Principles (Release 13) Dec. 20, 2013 consisting of 84-pages.
3GPP TS 32.130 V1.2.0 (Nov. 2014) 3rd Generation Partnership Project; Technical Specification Group Services and System Aspects; Telecommunication Management; Network Sharing; Concepts and requirements (Release 12) Dec. 22, 2014 consisting of 15-pages.
International Search Report and Written Opinion dated Jun. 26, 2015 for International Application No. PCT/SE2015/050097, International Filing Date Jan. 29, 2015 consisting of 10 pages.
3GPP TSG-RAN WG3#73 R3-111992, Agenda Item: 13, Source: NEC, Title: "RAN Sharing enhancements", Document for: Discussion and Decision, Conference Location and Date: Athens, Greece Aug. 22-26, 2011 consisting of 5-pages.
3GPP TR 22.852 V12.0.0 (Jun. 2013) "3rd Generation Partnership Project Technical Specification Group Services and System Aspects; Study on Radio Access Network (RAN) sharing enhancements (Release 12)" , Jun. 28, 2013 consisting of 29-pages.
U.S. Office Action dated Nov. 20, 2015 for U.S. Appl. No. 14/429,419, consisting of 19-pages.
U.S. Office Action dated Apr. 25, 2016 for U.S. Appl. No. 14/429,419, consisting of 14-pages.
U.S. Office Action dated Sep. 28, 2016 for U.S. Appl. No. 14/429,419, consisting of 14-pages.
U.S. Office Action dated Feb. 1, 2017 for U.S. Appl. No. 14/429,419, consisting of 11-pages.

* cited by examiner

25

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME Name | O | | Printable String(1..150,...) | | YES | ignore |
| Served GUMMEIs | | 0.. <maxnoof RATs> | | The LTE related pool configuration is included on the first place in the list. | GLOBAL | reject |
| Served PLMNs | | 1.. <maxnoof PLMNsPerMRATs> | | | | |
| >>PLMN Identity | M | | 9.2.3.8 | | | |
| >Served GroupIDs | | 1.. <maxnoof GroupIDs> | | | | |
| >>MME GroupID | M | | OCTET STRING (2) | | | |
| >>Served MMECs | | 1.. <maxnoof MMECs> | | | | |
| >>MME Code | M | | 9.2.3.12 | | | |
| Relative MME Capacity | O | | 9.2.1.17 | | YES | reject |
| Served GUMMEIs | | 1 | | Cell ID list for which measurement is needed | YES | ignore |
| >Cell To Report item | | 1.. <maxCellineNB> | | | EACH | ignore |
| >>Cell ID | M | | ECGI 9.2.14 | | | |
| >>RAN Sharing Report-IE1 | O | | ENUMERATED(PerPLMN, PerPLMNGroup,...) | | | |
| Reporting Periodicity-IE2 | O | | ENUMERATED(100oms, 2000ms, 5000ms, 1000ms, ...) | | YES | ignore |
| Partial Success Indicator | O | | ENUMERATED(partial success allowed, ...) | Included if partial success is allowed | YES | ignore |

*FIG. 4*

| IE/Group Name | Presence | Range | IE type and reference | Semantics description | Criticality | Assigned Criticality |
|---|---|---|---|---|---|---|
| Message Type | M | | 9.2.1.1 | | YES | reject |
| eNB Name | O | | PrintableString(1..150,...) | | YES | ignore |
| Supported TAs | | 0.. <maxnoofTACs> | | Supported TAs in the eNB. | GLOBAL | reject |
| >TAC | M | | 9.2.3.7 | Broadcasted TAC. | | |
| >Broadcast PLMNs | | 1.. <maxnoofBPLMNs> | | Supported TAs in the eNB. | | |
| >>PLMN Identity | M | | 9.2.3.8 | | | |
| CSG Id List | M | 0..1 | | | GLOBAL | reject |
| >CSG Id List | | 1.. <maxnoofCSGId> | 9.2.1.62 | | YES | ignore |
| Default Paging DRX | O | 1 | 9.2.1.16 | | YES | ignore |
| Cell Measurement Result | | 1.. <maxCellineNB> | | | EACH | ignore |
| >Cell Measurement Result Items | | | | | | |
| >>Cell ID | M | | ECGI 9.2.14 | | | |
| >>PLMN List-IE3 | | | Enumerated (0...MaxPLMNIDList) | Indicates the list of PLMN IDs in the group belonging to a sharing operator | | |
| >>>PLMNID-IE4 | M | | 9.2.4 | | | |
| >>Hardware Load Indicator-IE5 | O | | 9.2.34 | | | |
| >>S1 TNL Load Indicator-IE6 | O | | 9.2.35 | | | |
| >>Radio Resource Status-IE7 | O | | 9.2.37 | | | |
| >>Composite Available Capacity Group-IE8 | O | | 9.2.44 | | YES | ignore |
| >>ABS Status | O | | 9.2.58 | | YES | ignore |

FIG. 5

RESOURCE ALLOCATION AMONGST PARTIES SHARING THE SAME RADIO ACCESS NETWORK

FIELD

Wireless communication networks, and in particular to allocation of cell resources among operators sharing a radio access network (RAN).

BACKGROUND

Radio Access Network (RAN) sharing allows multiple operators to share the resources of a single evolved universal terrestrial radio access network (E-UTRAN) according to agreed resource allocation schemes. When these resources are shared they can be allocated unequally to the sharing operators, depending on the planned or current needs of these operators and based on service agreements with an owner of the E-UTRAN, which itself may be a sharing operator. For example, a given E-UTRAN may have a 40%/60% split for two sharing operators.

According to current RAN Sharing requirements defined by the Third Generation Partnership Project (3GPP), as defined in the 3GPP Standard technical specification, TS 22.101, resources should be allocated at the E-UTRAN per public land mobile network (PLMN) and, a sharing operator should be able to dynamically or semi-statically negotiate its quota in a cell level basis. For example, instead of a 40%/60%, an operator could request a 50%/50% split either always or during specific periods of the day for selected cells. There are currently no appropriate mechanisms to support this type of functionality due to several problems.

One problem is that current specifications only allow exchanging of cell resource utilization information between evolved node B (eNB) base stations on a per-cell basis. For load balancing purposes, a given cell is able to request its neighbor cells to provide their cell resource utilizations and get periodic reports when both cells are configured by the same mobile network operator. Therefore, current specifications do not allow for exchanging of cell resource utilizations on a per-sharing operator basis to neighbor base stations. This prevents load distribution and balancing to work correctly in the presence of sharing operators.

Another problem is that resource utilization measures, that could eventually trigger a quota re-configuration per sharing operator, are not reported on a per-sharing operator level of granularity to any centralized location so that decisions relating to quota re-configuration could be made. Also, there are currently no mechanisms allowing a sharing operator to optimally re-configure its quota in a shared RAN scenario. In a shared RAN scenario, the core network elements can either be per operator or shared. For example, if Long Term Evolution (LTE) is considered, the E-UTRAN resource utilization is only exchanged between base stations. Therefore, the E-UTRAN load is not reported to the mobile management entity (MME). The only load reporting procedures involving the base station and the core network, over the S1 interface, are the START OVERLOAD and STOP OVERLOADING procedures, where the MME may inform the base station about a signaling overload.

In a typical management system in 3GPP architecture, the node elements (NE), also referred to as base stations or as eNodesB in the case of E-UTRAN, are managed by a domain manager (DM), also referred to as the operation and support system (OSS). A DM may further be managed by a network manager (NM). Two base stations are interfaced by X2, whereas the interface between two DMs is referred to as Itf-P2P. The management system may configure the base stations, as well as receive observations associated with features of the network elements. For example, a DM observes and configures NEs, while an NM observes and configures a DM, as well as NEs via a DM.

In RAN sharing, different management architectures may exist. Thus, in some configurations, a shared E-UTRAN has a single DM and some of its functionalities, e.g., performance management (PM) may be accessed by multiple different Network Management Systems (NMSs) associated with each PLMN. In some configurations, each sharing operator can have its own Operation, Administration and Maintenance (OAM) capabilities, but, according to 3GPP specifications, information exchanges should be controlled by the hosting operator.

According to 3GPP specifications, selected OAM capabilities for the shared E-UTRAN, under the control of the hosting E-UTRAN operator, should be accessible by the sharing operator's OAM functions. This would allow, for example, the sharing operator to i) test the communication path between the sharing operator's network elements and the shared E-UTRAN, ii) obtain fault reports and iii) retrieve RAN resource usage information.

Two examples of network management architectures are shown in FIGS. 1 and 2, one with a shared core as in FIG. 1 and one with a common core as shown in FIG. 2. In each of FIGS. 1 and 2, two network management systems 10*a* and 10*b*, one for each public land mobile network (PLMN) for operators A and B, are in communication with a common domain manager 12 which is in communication with a base station 14 in which the resources of a cell of the base station are shared by the operators A and B. In FIG. 1, a core network element 16*a*, which could be a mobile management entity (MME) in a long term evolution (LTE) network, is provided for operator A and a core network element 16*b* is provided for operator B. In contrast, in the architecture of FIG. 2, a common core network element 18 is shared by operators A and B.

Resource utilization and/or load information may also be obtained at the Operations and Support System (OSS), e.g., by the downloading of reporting output period (ROP) files stored at the base station containing information from counters that measure the resource utilization as defined by the 3GPP in TS 32.425. As an example, the following counters have been defined:

4.5 Radio resource utilization related measurements
    4.5.1 DL PRB Usage for traffic
    4.5.2 UL PRB Usage for traffic
    4.5.3 DL Total PRB Usage
    4.5.4 UL Total PRB Usage
    4.5.5 RACH Usage
    4.5.5.1 Mean number of RACH preambles received
    4.5.5.2 Distribution of RACH preambles sent
    4.5.5.3 Distribution of RACH access delay
    4.5.5.4 Percentage of contentious RACH attempts
    4.5.5.5 Number of UE RACH reports received
    4.5.5.6 Percentage of time when all dedicated RACH preambles are used
    4.5.6 Cell Unavailable Time
    4.5.7 TB related measurements
    4.5.7.1 Total Number of DL TBs
    4.5.7.2 Error Number of DL TBs
    4.5.7.3 Total Number of UL TBs
    4.5.7.4 Error Number of UL TBs
    4.5.8 Power utilization measurements
    4.5.8.1 Maximum carrier transmit power 4.5.8.2 Mean carrier transmit power
4.5.9 PRB Full Utilization
4.5.9.1 DL PRB full utilization
4.5.9.2 UL PRB full utilization According to 3GPP specifications in TS 32.425, all these measurements are performed at the cell level (EUtranCellFDD and EUtranCellTDD), so it is not possible to differentiate resource utilization measures per PLMN in a RAN Sharing scenario. The same can be said of other similar procedures in different technologies and over different interfaces, such as the Overload Start and Overload Stop procedures over S1; the Inter RAT RAN Information Management (RIM) based Cell Load Report; and similar procedures available for UTRAN technologies.

It is currently not possible to signal the load or resource utilization to any centralized network node, e.g., MME or OAM, so that this node is able to take resource re-allocation decisions per PLMN, i.e., re-configuring capacity quota per sharing operator. The existing granularity on a per-cell basis, either via S1 to the MME or to the OAM using existing counters, is not sufficient for control of resources, load and available capacity to be maintained on a per sharing operator basis.

A shared RAN may include a split between two (or more operators) as well as a commonly shared set of resources, e.g., 5% dedicated to operator A, 45% dedicated to operator B and 50% shared resources, as shown in FIG. 3. In FIG. 3, a RAN 20 has a first base station 14a and a second base station 14b serving cells 22a and 22b, respectively. Cells 22a and 22b serve user equipment (UE) 24a associated with operator A and UE 24b associated with operator B, respectively. A problem with the existing solutions is a lack of methods to negotiate and re-configure the resource quota to be assigned per sharing operator and on a per cell/network basis when one or multiple operators have a higher demand than their current quota per shared node. In summary, current specifications do not provide granularity higher than a per-cell basis for reporting of information that can help in determining load, resource utilization, and available capacity.

SUMMARY

Systems and method for reporting and allocating resources of a cell served by a base station are disclosed. According to one aspect, embodiments provide a method in a base station of allocating resources of a cell served by the base station among a plurality of operators sharing the cell resources. The method includes receiving from a central node serving at least the base station. The resource allocation request instructs the base station to reallocate the cell resources among the plurality of operators. The method further includes allocating cell resources among the plurality of operators according to the resource allocation request received from the central node.

According to this aspect, in some embodiments, the method further includes performing cell resource utilization measurements for each of the plurality of sharing operators, and reporting the cell resource utilization measurements to the central node. In some embodiments, the reallocation is based on the cell resource utilization measurements and based on at least one cell resource utilization policy. In some embodiments, at least one cell resource utilization policy is based on a service agreement between at least two operators of the plurality of operators. In some embodiments, the cell resource utilization policy is a specification of a percentage of cell resources to be allocated to at least one of the at least two operators. In some embodiments, the cell resource utilization policy is a specification of percentages of cell resources to be allocated to at least one of the at least two operators in each of a plurality of cells. In some embodiments, the cell resource utilization policy is a specification of a percentage of cell resources that may be reallocated at the base station. In some embodiments, performing cell resource utilization measurements for each of the plurality of operators includes determining cell resource utilization for each public land mobile network (PLMN) associated with a corresponding operator of the plurality of operators. In some embodiments, performing cell resource utilization measurements comprises measuring, by at least one counter, at least one of uplink physical resource block usage, downlink physical resource block usage, random access channel usage, power utilization, and downlink transport block usage. In some embodiments, cell resource utilization includes at least one of a hardware load and an interface signaling load.

According to another aspect, embodiments provide a method in a resource allocation controller of determining a cell resource utilization of a cell of a base station, the cell being shared by a plurality of operators. The method includes receiving a current cell resource utilization by each of the plurality of operators. The method also includes assigning cell resource utilization quotas per each of the plurality of operators based on cell resource utilization policies. The method further includes comparing the current cell resource utilization to the assigned cell resource utilization quotas to determine whether to initiate a cell resource utilization reallocation of cell resources among the plurality of operators.

According to this aspect, in some embodiments, the method includes initiating the cell resource utilization reallocation of cell resources among the plurality of operators by transmitting a message containing the cell resource utilization reallocation on an S1 interface connecting the resource allocation controller to the base station. In some embodiments, the method further includes initiating reports to be generated by the base station of cell resource utilizations via a message that includes a Radio Access Network (RAN) sharing instruction specifying a periodicity of the reports.

According to yet another aspect, embodiments provide a resource allocation controller (RAC). The RAC includes a communication interface configured to receive cell resource utilizations from a base station and to transmit cell resource utilization reallocations to the base station. The RAC also includes a processor and a memory. The memory is configured to store current cell resource utilization by each of a plurality of operators sharing resources of a cell. The memory is also configured to store assigned cell resource utilization quotas per each of the plurality of operators based on cell resource utilization policies. The memory is also configured to contain instructions executable by the processor to configure the processor to compare current cell resource utilization to assigned cell resource utilization quotas to determine whether to initiate a cell resource utilization reallocation of cell resources among the plurality of operators.

According to this aspect, in some embodiments, the processor is further configured to compare an assigned cell resource utilization quota to a cell utilization quota requested by an operator of the plurality of operators. In some embodiments, the cell resource utilization reallocation specifies a percentage of cell resources to be allocated to each of the plurality of operators. In some embodiments, the cell resource utilization reallocations are based on a cell resource utilization policy that specifies a change in an allocation of cell resources to an operator in one cell when a change in cell resource utilization by the operator occurs in another cell. In some embodiments, the processor is further configured to reallocate cell resources based on an indication that an operator of the plurality of operators has excess capacity. In some embodiments, the processor is further configured to reallocate cell resources based on a determination of unused cell resources. In some embodiments, the RAC is located in a mobile management entity (MME) and the current cell resource utilization is measured at a base station remote from the RAC, and communicated to the RAC on a long term evolution, LTE, S1 interface. In some embodiments, the RAC is located in a domain manager and receives current cell resource utilizations on an Operation, Administration and Maintenance, (OAM) interface. In some embodiments, the current cell resource utilizations are communicated from the base station to the RAC via a CONFIGURATION UPDATE message. In some embodiments, the CONFIGURATION UPDATE message includes information elements that specify current cell resource utilization of at least one public land mobile network, PLMN, associated with a corresponding operator of the plurality of operators.

According to another aspect, embodiments provide a resource allocation controller (RAC). The RAC includes a communication interface module configured to receive cell resource utilizations from a base station serving a cell having resources shared by a plurality of operators and to transmit cell resource utilization reallocations to the base station. The RAC also includes a cell resource utilization quota assignment module configured to assign cell resource utilization quotas per each of the plurality of operators based on cell resource utilization policies. The RAC also includes a cell resource utilization comparison module configured to compare current cell resource utilization to assigned cell resource utilization quotas to determine whether to initiate a cell resource utilization reallocation of cell resources among the plurality of operators.

According to yet another aspect, embodiments provide a base station serving a cell and configured for communication with a central node. The base station includes a communication interface configured to receive cell resource utilization quotas from the central node and to transmit cell resource utilizations to the central node. The base station also includes a processor and a memory. The memory is configured to store measured cell resource utilizations assigned cell resource utilization quotas. The memory is further configured to contain instructions executable by the processor to configure the processor to measure cell resource utilizations of a plurality of operators sharing cell resources, allocate cell resources among the plurality of operators and renegotiate allocation quotas.

According to another aspect, embodiments provide a base station serving a cell and configured for communication with a central node. The base station includes a performance measurement module configured to measure cell resource utilization of each of a plurality of operators sharing the cell; and a cell resource allocation module configured to allocate cell resources among the plurality of sharing operators according to cell resource utilization quotas.

According to this aspect, in some embodiments, the base station further includes a communication interface module to receive assigned cell resource utilization quotas from a resource allocation controller and to report measured cell resource utilizations to the resource allocation controller. In some embodiments, the base station further includes, a quota renegotiation module configured to reallocate cell resources based on requests for cell resources from at least one of the plurality of operators, the reallocation of cell resources being different from an allocation of cell resources specified by the cell resource utilization quotas. In some embodiments, the reallocation is such that cell resource utilization for each operator of the plurality of operators is allowed to exceed a respective cell resource utilization quota until there are no spare cell resources. In some embodiments, the reallocation is such that cell resource utilization for an operator of the plurality of operators is allowed to exceed a corresponding cell resource utilization quota by a maximum amount. In some embodiments, the reallocation is such that cell resource utilization for an operator of the plurality of operators is allowed to exceed a corresponding cell resource utilization quota for a specified service.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 4 is an MME configuration update message having a RAN sharing report information element;

FIG. 5 is a base station configuration update message indicating per sharing operator resource utilization;

DETAILED DESCRIPTION

Figure 1:
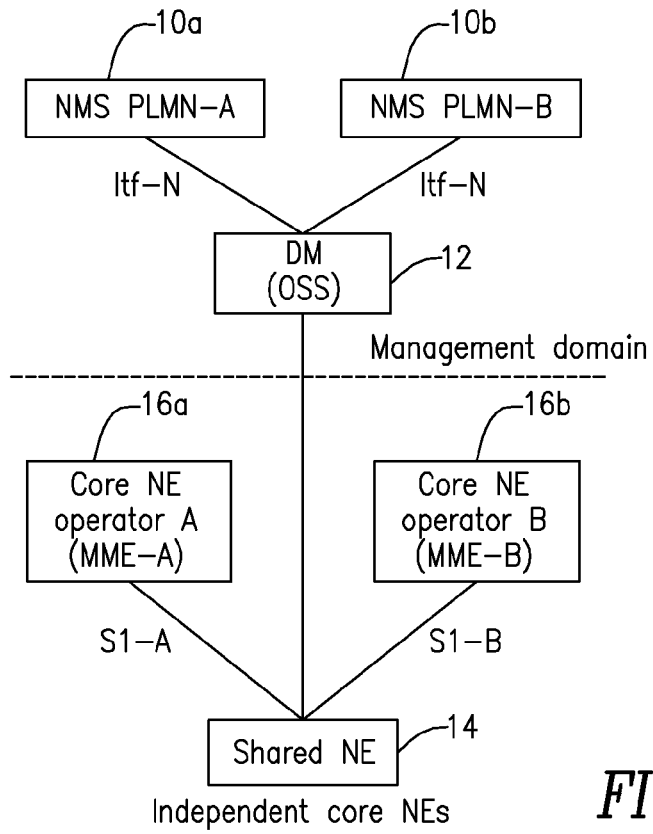
FIG. 1 is a block diagram of a shared core network management architecture.
Figure 2:
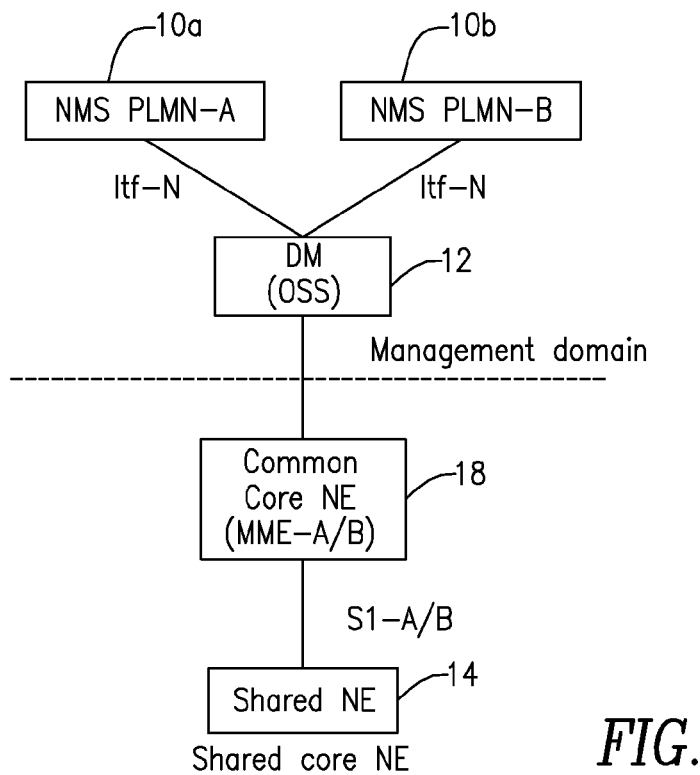
FIG. 2 is a block diagram of a common core network management architecture.
Figure 3:
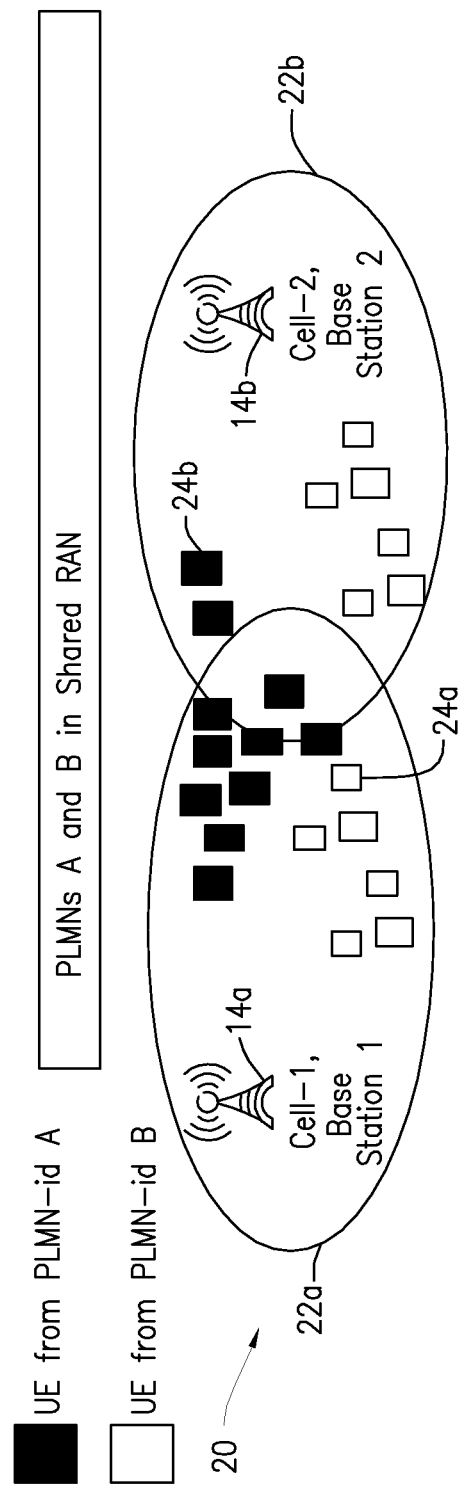
FIG. 3 is a diagram of sharing of cell resources by two different operators.

Before describing in detail exemplary embodiments that are in accordance with the present disclosure, it is noted that the embodiments reside primarily in combinations of apparatus components and processing steps related to sharing of cell resources among a plurality of sharing operators. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In the following description the example of LTE networks is used. However, the methods described hereby are applicable to any radio access technology and/or systems where it is possible to share radio resources among different parties such as different operators. Thus, an eNB is but one example of a base station.

Mechanisms are described herein for a resource allocation controller (RAC) to perform quota re-configuration at the E-UTRAN. In one embodiment, the re-configuration is triggered by the MME using an S1: MME CONFIGURATION UPDATE message enhanced by a new information element (IE) called "Quota Reconfiguration." After the base station reconfiguration, information may be updated at the OAM system using existing mechanisms. In some embodiments, the re-configuration is performed at the OAM system, which may update the base station with the new quotas per PLMN or per PLMN group, i.e., per sharing operator utilizing a given group of PLMN IDs, so that the base station can behave according to the new settings. In some embodiments, the RAC can decide to apply policies for each sharing operator that would allow the sharing operator to exceed its resource quota in one of the following ways:

Exceed resource quota when cell capacity is available and sharing operator's resource quota is fully utilized; and Exceed resource quota only for particular services, for example emergency services; this could be allowed either if cell capacity is still available or it could be allowed always, at the expense of other traffic that would need to be dropped in case of full cell capacity utilization.

In some embodiments, the procedures used to report cell resource utilization such as hardware load, interface, e.g., S1 signaling load and radio resource utilization, are exchanged between the MME and base station on a per PLMN or PLMN group basis. For example, it may be assumed that each base station is configured with information about the list of PLMN IDs associated with each sharing operator. For example, such configuration might occur by means of signaling with the Operation, Administration and Maintenance (OAM) system.

On the basis of such PLMN ID grouping, the S1: MME CONFIGURATION UPDATE 25 may be enhanced with an extra parameter, indicating the request of per sharing operator load related parameters. As an example, FIG. 4 shows how a new information element (IE), named RAN Sharing Report IE1, is added for each cell for which parameters shall be reported. IE1 enables reporting on a per-PLMN or per-PLMN-group. Consequently, in some embodiments, a reporting periodicity IE2 may specify periodicity of reporting for each PLMN or PLMN group, rather than for the cell as a whole. This may also be achieved with a new message, e.g., called LOAD REQUEST, containing the new IEs proposed for the enhanced message. The message arriving at the base station can either be interpreted as an immediate request for a cell resource utilization measure, or a configuration that triggers periodic cell resource utilization reports, according to the parameters indicated in the enhanced MME CONFIGURATION UPDATE message, e.g., reporting periodicity, etc.

In response to the cell resource utilization request or configuration update per PLMN sent from the MME, and on the basis of PLMN ID grouping, the S1: BASE STATION CONFIGURATION UPDATE message 27 is enhanced with new IEs indicating a per sharing operator reporting of cell resource utilization. This enhanced message is shown in FIG. 5, where the following new information elements are added: PLMN List, IE3 and PLMN ID, IE4. Then, resource utilization parameters of IE5-IE8, are reported for each PLMN, rather than for the cell as a whole. The information elements IE5-IE8 include a hardware load indicator indicating a load on hardware for the PLMN, a transport network layer (TNL) Load indicator indicating a TNL load per PLMN, a radio resource status indicating the usage of the physical resource blocks (PRB) for all traffic in the downlink and uplink per PLMN, and a composite available capacity group indicating the overall available resource level in the cell downlink and uplink per PLMN. The per sharing operator reporting of cell resource utilization can alternatively be achieved with a new message, e.g., called SHARING LOAD RESPONSE, which contains the new IEs specified in the previous enhanced message. Note that the new information added to an existing S1AP procedure may be added to any other suitable procedure between base station and MME, or may be transported via new procedures.

The reported cell resource utilization from the E-UTRAN to the MME is processed by the Resource Allocation Controller (RAC), which may be located at the MME. Based on collected statistics from the cell resource utilization measurements reported per PLMN in the previous messages and, assuming the RAC has access to the current capacity quota per sharing operator per Shared base station, and assuming that the RAC is configured with quota policies per operator when it comes to re-negotiation, e.g., a maximum percentage of a quota that can be re-negotiated to another operator, the RAC function computes updated quota values per sharing operator.

If the new capacity quotas are within the limits established in a Service Level Agreement (SLA) between the sharing operators, translated into the policies received by the RAC, the system may automatically update the shared base stations and correspondent nodes with the new settings. In some embodiments, this quota update is achieved by further enhancing the MME CONFIGURATION UPDATE, or by enhancing any other suitable procedure between base station and MME, or by creating a new dedicated procedure with a new IE named "Quota per Sharing PLMN" having the new values. Using these management mechanisms, the sharing base station itself can update the new quota in another relevant node, via its own OAM system.

Figure 6:
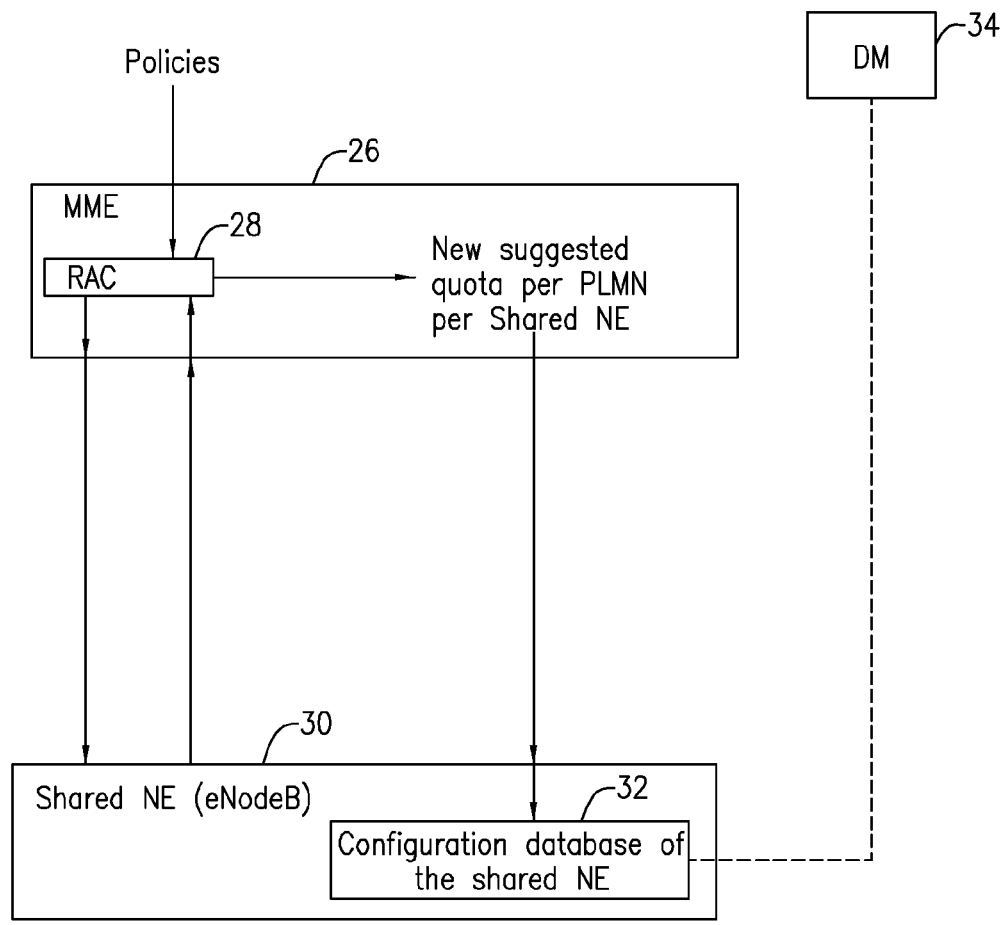
FIG. 6 is a block diagram of an exemplary embodiment for implementing per sharing operator cell resource utilization information exchange.

FIG. 6 is a diagram illustrating an embodiment for the exchange of cell resource utilization information to achieve a configuration change on a per-shared operator basis according to principles of the disclosure. A central node such as an MME 26 has a resource allocation controller (RAC) 28 that receives policies from sharing operators concerning utilization of their quotas by other operators. The policies may be based on service level agreements between sharing operators, and may specify an amount of resources allocated to one sharing operator that can be used by another sharing operator.

The RAC 28 may send a configuration update message 25 on an S1 interface to the shared network element (NE) 30 which may be a base station such as an eNB. The configuration update message 25 may include a resource utilization request which requests reallocation of resources per PLMN or sharing operator. Note that a sharing operator may be associated with more than one PLMN but a PLMN is associated with only one sharing operator. The RAC 28 receives a configuration update message 27 from the shared network element (base station) 30 which reports cell resource utilization per PLMN or per PLMN group for each sharing operator. Based on the policies and the reported per PLMN cell resource utilization, the RAC 28 may suggest new cell resource utilization quotas for one or more of the sharing operators, i.e., for each PLMN or PLMN group. The new cell resource utilization quotas are sent to the base station 30 in a configuration update message on the S1 interface and stored by the base station 30 in a configuration database 32. The configuration database 32 may share configuration data with a domain manager 34, which performs OAM functions.

Figure 7:
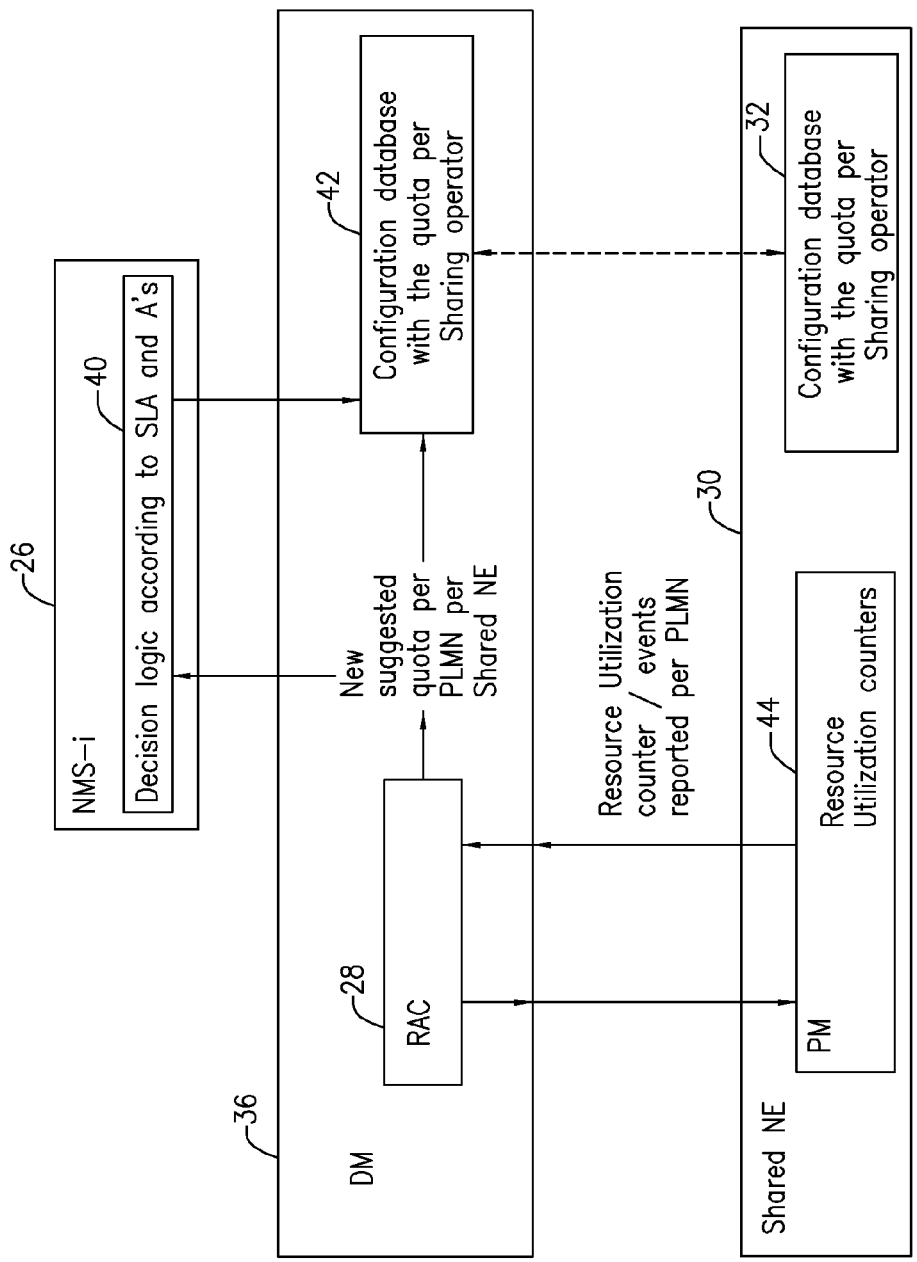
FIG. 7 is a block diagram of another exemplary embodiment for implementing per sharing operator cell resource utilization information exchange.

FIG. 7 shows another embodiment of information exchange between network elements according to principles of the present disclosure. In this embodiment, the procedures used to report load related parameters such as hardware load, interface, e.g., S1, signaling load and radio resource utilization, are between the shared base stations 30 and their respective operation, administration and maintenance (OAM) systems which may be accessed by independent NMSs 38 associated with each sharing operator. In the embodiment of FIG. 7 the OAM functions are performed by the domain manager 36, which also has the RAC 28 and the configuration database 42. Each NMS 38 has decision logic 40 which approves or disapproves of suggested resource utilization quota from the domain manager 36. It may be assumed that each base station 30 is configured with information about the list of PLMN IDs associated with each sharing operator. This information may be stored in a local configuration database 32 and also stored in a configuration database 42 in the domain manager 36. For example, such configuration may be achieved by signaling with the OAM system. On the basis of PLMN ID grouping, the base station counters related to resource utilization, defined in 3GPP specification TS 32.425, are enhanced so that the base station perform measurements per PLMN and stores them in respective counters 44. These may be stored at the base station 30 and may either be downloaded by the OAM system or streamed to the base station 30, or streamed to an external server.

The RAC function 28 at the OAM configures the "performance monitoring" or scanners at the PM system 44 of the base station 30 to measure the resource utilization per PLMN. These counters/events are stored in the PM system of the shared base station 30 or, alternatively, events/counters are streamed to the RAC function 28 or another server, according to the configuration of FIG. 7.

Thus, the reported resource utilization from the E-UTRAN to the OAM system is processed by the Resource Allocation Controller (RAC) 28, which may be located at the OAM system. Based on collected statistics from the resource utilization measurements reported per PLMN in the previous messages, the RAC function 28 computes updated quota values per sharing operator. These values are submitted to a decision logic function 40 at the NMS 38 of each operator in order to be approved by the operator affected by such suggestions. The decision logic 40 at the NMS 38 is configured according to the operator policy pertaining to shared resources, partially defined by the SLAs between sharing operators. An example of a policy could be translated as "allow the reduction of my quota of 5% in certain base stations if in other areas I am compensated by the same 5% or less". In this case, the overall division could still be the same, or a notification may be reported to the NMS 38 of each sharing operator affected by the negotiation.

When the new proposed quotas are at least partially accepted, e.g., the RAC 28 proposed to reduce the quota from 35% to 20%, but the decision logic proposed 25% instead, the result returned by the decision logic from the NMS 38 back to the domain manager 36 will be fed to the configuration database 42 with the quota per sharing operator by a communication link between the decision logic 40 and the database 42. This enables the result to be fed to the shared base station 30 using existing proprietary mechanisms so that the shared E-UTRAN can behave according to the new quotas.

Figure 8:
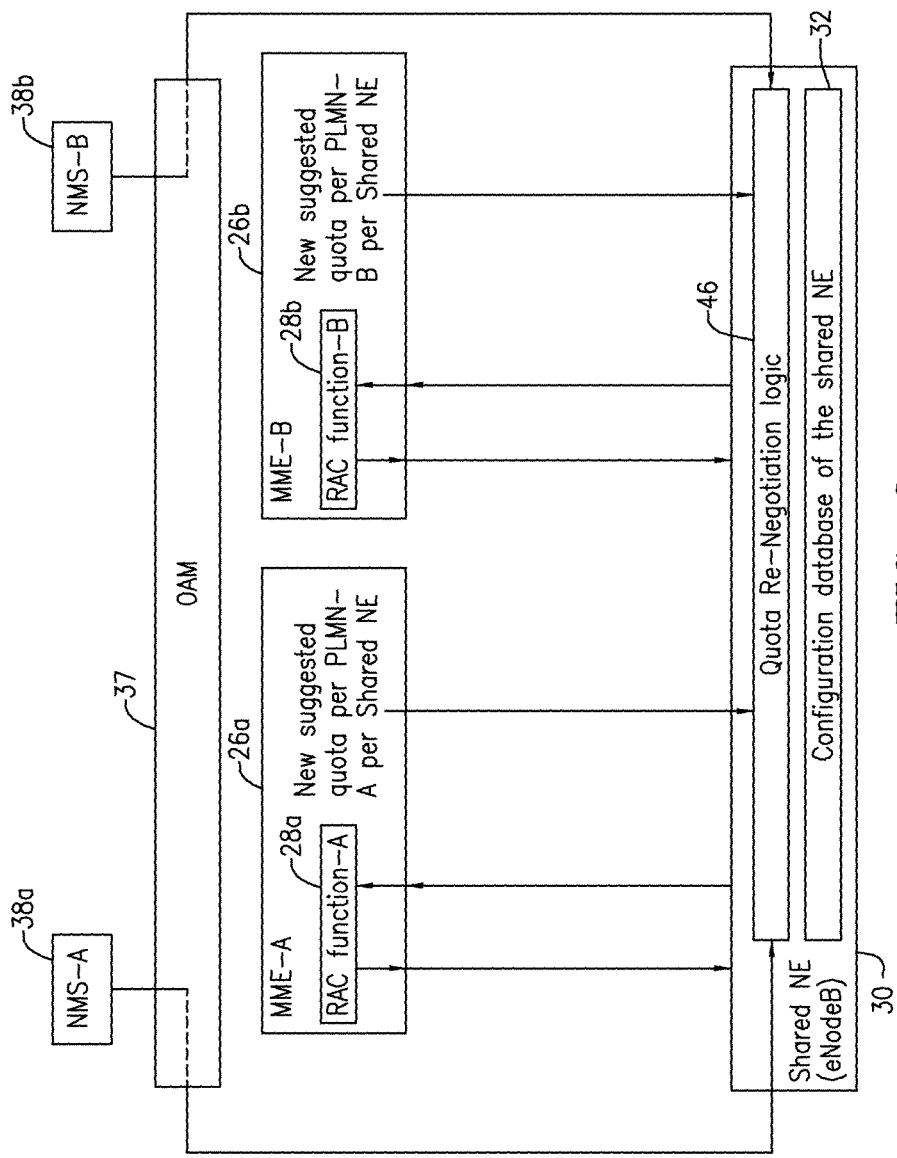
FIG. 8 is a block diagram of another exemplary embodiment for implementing per sharing operator cell resource utilization information exchange.

Another embodiment is shown in FIG. 8. In this embodiment, the base station 30 reports the resource utilization information per PLMN to the RAC 28a of the MME 26a of operator A and to the RAC 28b of the MME 26b of operator B. Thus, in this embodiment, each sharing operator has its own RAC function placed in its own MME. Resource utilization information is reported to the MME using the enhanced S1: MME CONFIGURATION UPDATE message. Alternatively, the resource utilization information may be reported by an equivalent enhanced procedure or a new procedure. This new procedure may contain only the resource utilization associated with a RAC's own PLMN and an optional IE called "Additional Spare Capacity" that is defined as the addition of spare capacity announced by other sharing operators. The "Additional Spare Capacity" per PLMN is configured at the shared RAN via the OAM 37 which may be accessed by each NMS 38 of a sharing operator.

The RAC 28 associated with each PLMN receives the resource utilization reports as well as the total amount of available spare capacity and suggests a new quota for its own PLMN. The same procedure occurs with the other RACs 28 placed at the MMEs 26 of sharing operators. The suggested quotas per RAC 28 of PLMNs are received at the base station 30 and processed at quota re-negotiation logic 46 which process the suggestion and re-configures the quotas according to pre-defined policies, e.g., set via OAM 37/NMS 38.

If the quota renegotiation logic 46 of the base station 30 realizes that the resource quotas assigned to each operator do not sum up to the overall cell capacity, i.e., there is some spare capacity left, the logic may decide to apply a policy according to options such as the ones below:
  allow each sharing operator to exceed its quota until there are spare resources in the cell;
    allow each sharing operator to exceed its quota up to a maximum value; or
    allow each sharing operator to exceed its quota only for certain services (e.g., emergency) and either up to a certain maximum or up to the point when cell resources run out.

Thus, some embodiments allow the reporting of cell resource utilization on a per PLMN basis to a central node that can compute new capacity sharing quota in a dynamic or semi-static fashion and automatically reconfigure the quota at a shared RAN based on the sharing operator policies. Some embodiments enable monitoring and control of resources utilized by different parties such as operators sharing the same radio access cells. Some embodiments provide a platform according to which it is possible to re-negotiate the capacity quota per sharing operator in a dynamic or semi-static way. Some embodiments provide a mechanism for reporting, on a per-sharing-operator basis, utilization of resources to a central entity capable of deciding a reconfiguration of resource quota per sharing operator per cell and per period of time, e.g., day, week, or month.

Figure 9:
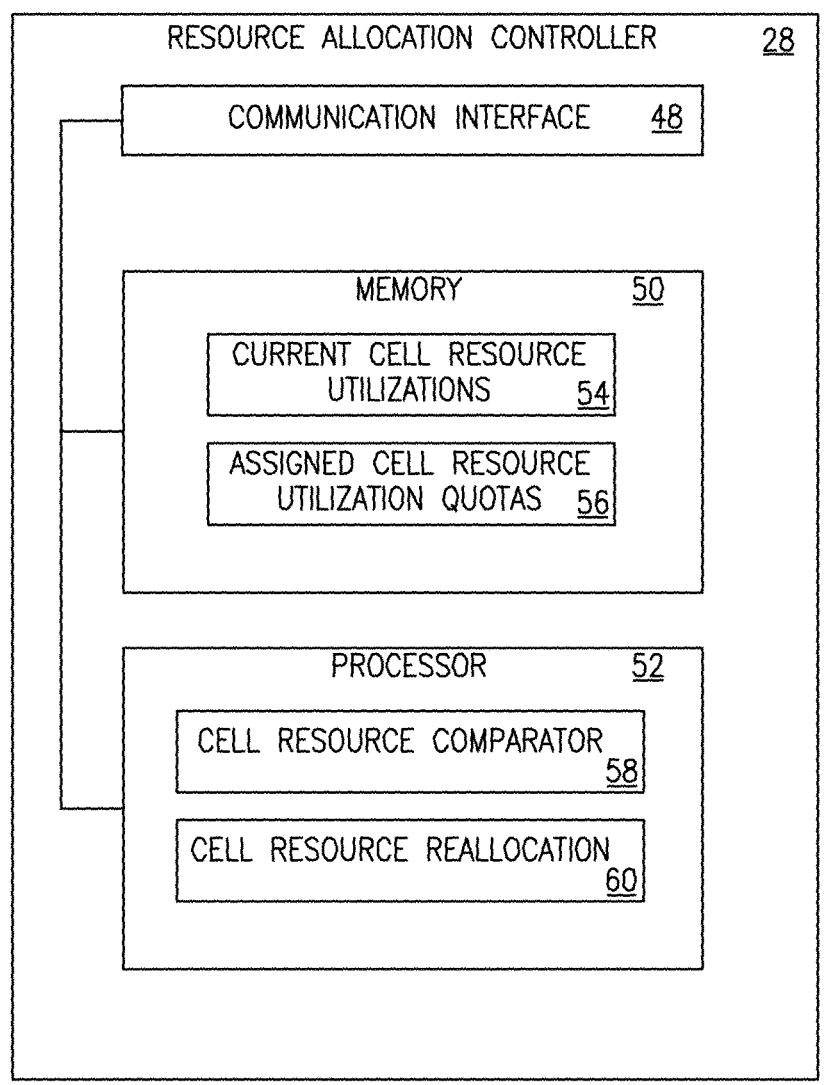
FIG. 9 is a block diagram of a resource allocation controller configured to determine resource reallocation for one or more cells in one or more base stations.

FIG. 9 is a block diagram of a resource allocation controller (RAC) 28 configured to determine cell resource reallocation for one or more cells in one or more base stations. The RAC 28 includes a communication interface 48, a memory 50 and a processor 52. The communication interface 48 is configured to receive cell resource utilizations from a base station, as in message 27, and to transmit cell resource utilization reallocation quotas to the base stations. The processor 52 is configured to execute computer instructions stored in the memory 50. The memory 50 is configured to store current cell resource utilization 54 by each of multiple operators sharing resources of a cell and assigned cell resource utilization quotas 56 per each of the multiple operators based on cell resource utilization policies. The memory 50 is further configured to contain instructions executable by the processor to configure the processor to compare 58 current cell resource utilization to assigned cell resource utilization quotas to determine whether to initiate a cell resource utilization reallocation 60 of cell resources among the plurality of operators.

Figure 10:
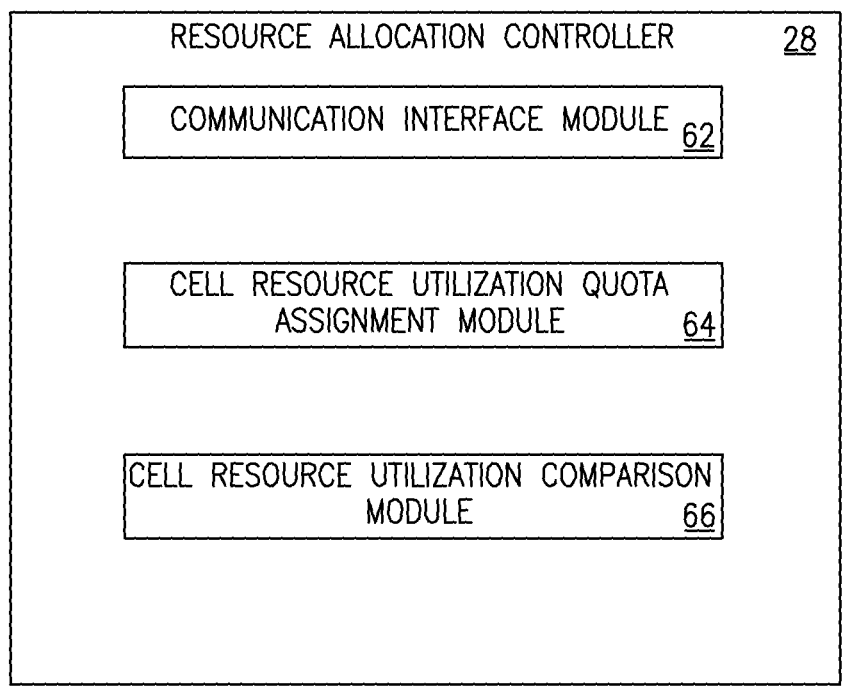
FIG. 10 is a block diagram of a resource allocation controller configured to determine resource reallocation for one or more cells in one or more base stations.

FIG. 10 is a block diagram of an RAC 28 that may be implemented by a processor executing computer instructions. The RAC 28 includes a communication interface module 62 configured to receive cell resource utilizations, such as via a message 27, from a base station serving a cell having resources shared by a plurality of operators and to transmit cell resource utilization quotas to the base station. A cell resource utilization quota assignment module 64 is configured to assign cell resource utilization quotas per each of the plurality of operators based on cell resource utilization policies. A cell resource utilization comparison module 66 is configured to compare current cell resource utilization to assigned cell resource utilization quotas to determine whether to initiate a reallocation of cell resources among the plurality of operators.

Figure 11:
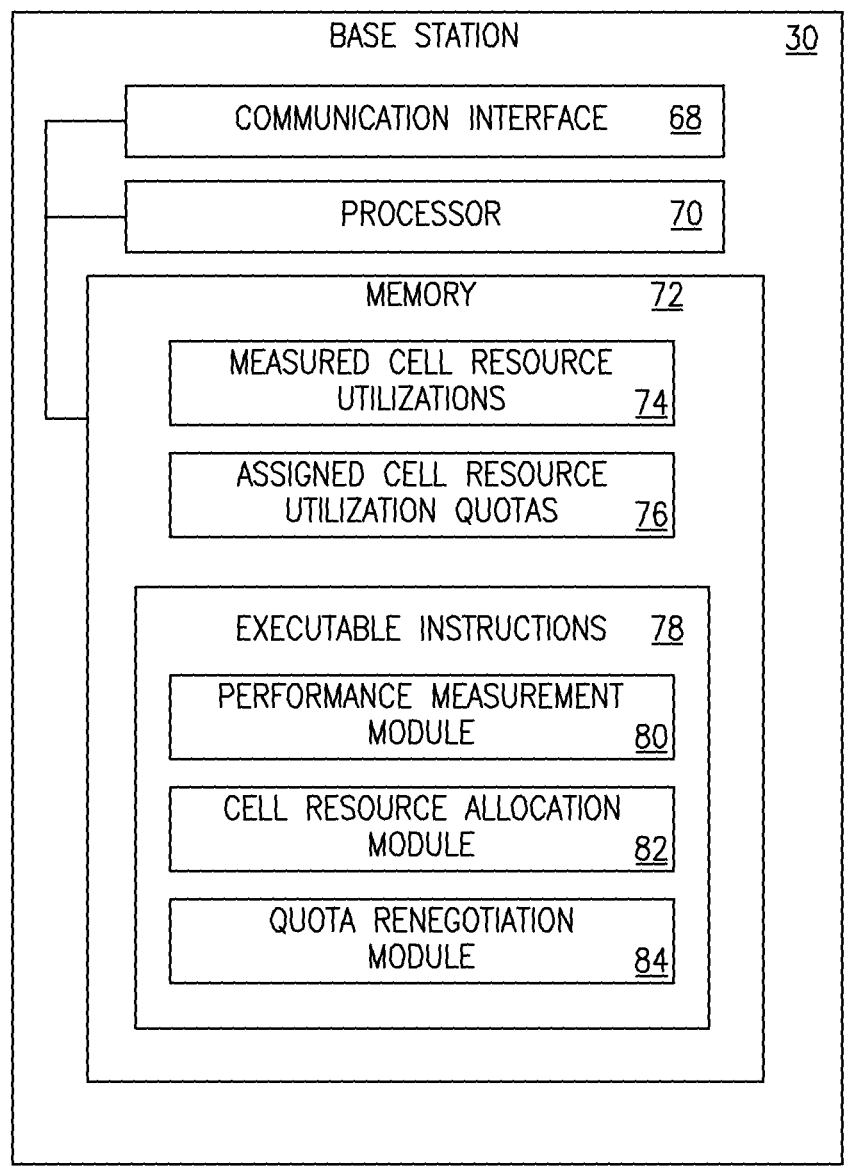
FIG. 11 is block diagram of a base station configured to receive resource reallocation requests and report per sharing operator resource utilizations.

FIG. 11 is a block diagram of a base station, e.g., an base station, 30 configured to receive resource reallocation requests and report per sharing operator resource utilizations via, for example, a message 27. The base station 30 includes a communication interface 68, a processor 70 and a memory 72. The communication interface 68 is configured to receive cell resource utilization quotas from the central node and to transmit cell resource utilizations to the central node. The processor 70 is configured to execute computer instructions stored in the memory 72. The memory 72 is configured to store measured cell resource utilizations 74, and assigned cell resource utilization quotas 76. The memory 72 is also configured to contain instructions executable by the processor 70 to configure the processor 70 to measure cell resource utilizations 80 of a plurality of operators sharing cell resources. The processor 70 is also configured to allocate 82 cell resources among the plurality of operators; and renegotiate allocation quotas 84.

Figure 12:
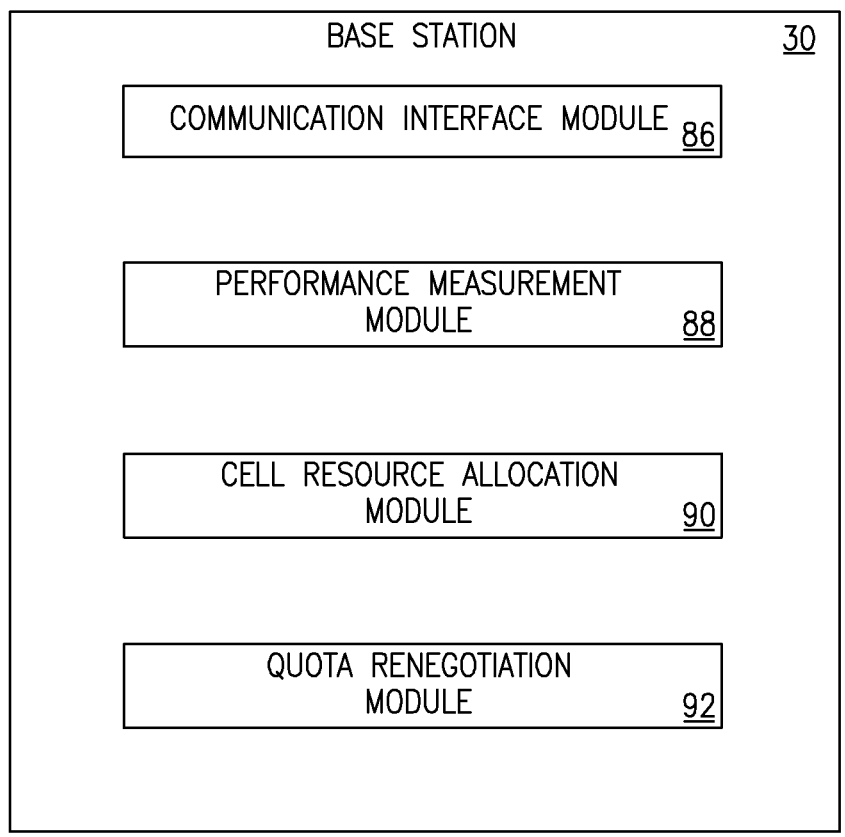
FIG. 12 is block diagram of a base station configured to receive resource reallocation requests and report per sharing operator resource utilizations.

FIG. 12 is a block diagram of a base station 30 that may be implemented by a processor executing computer instructions. The base station 30 includes a communication interface module 86 to receive cell resource utilization quotas per PLMN from a central node and to transmit cell resource utilization quotas per PLMN to the central node via, for example, a message 27. The base station 30 also includes a performance measurement module 88 configured to measure cell resource utilization per PLMN, i.e., per each of a plurality of operators sharing the cell. A cell resource allocation module 90 is configured to allocate cell resources among the plurality of sharing operators according to cell resource utilization quotas. The base station 30 also includes a quota renegotiation module 92 configured to reallocate cell resources based on requests for cell resources from at least one of the plurality of operators, the reallocation being different from a reallocation of resources specified by the cell resource utilization quotas.

Figure 13:
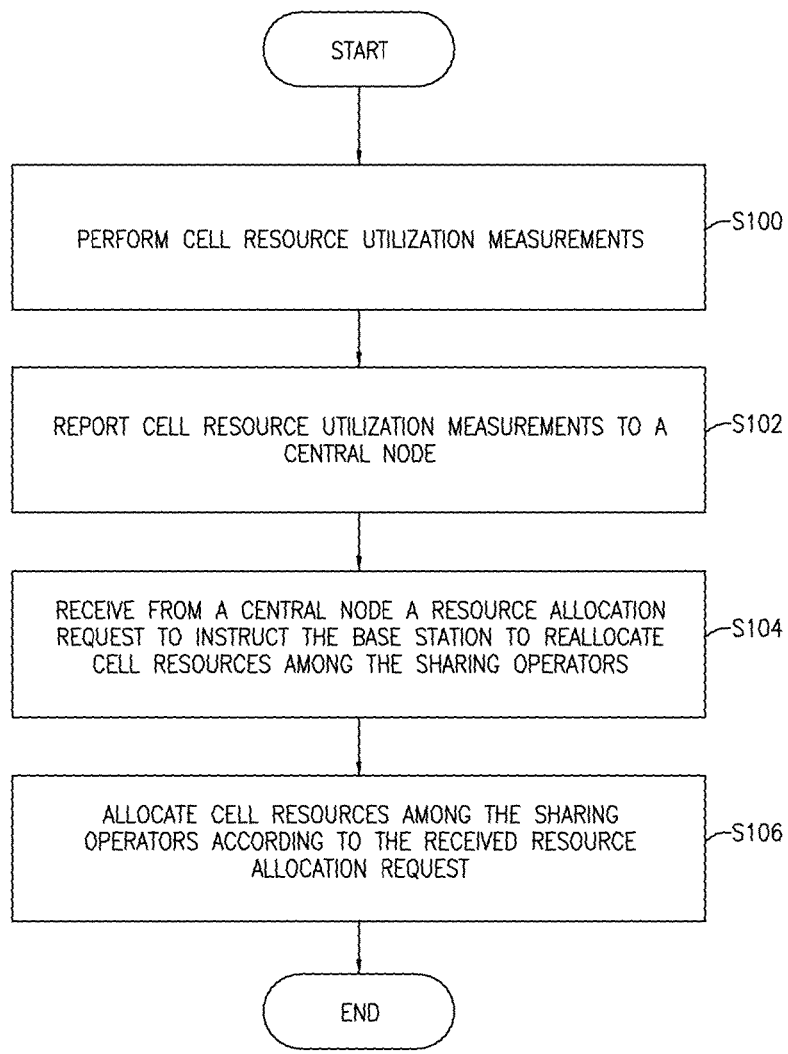
FIG. 13 is a flowchart of an exemplary process for per sharing operator resource reporting and resource reallocation.

FIG. 13 is a flowchart of an exemplary process for per sharing operator resource reporting and allocation. A base station 30 serving a cell having resources shared by a plurality of operators performs cell resource utilization measurements (block S100). Measured cell resource utilization measurements are reported to a central node 26 (block S102) via, for example, a message 27. A resource allocation request is received from the central node 26 to instruct the base station 30 to reallocate cell resources among the sharing operators (block S104). In response to the request the base station 30 reallocates the resources among the sharing operators (block S106).

Thus, some embodiments enable reporting of resource utilization on a per PLMN basis to a central node that can compute resource allocation quotas based on sharing operator policies that may be established by a service level agreement. Monitoring and control of resources utilized by a plurality of operators sharing cell resources is enabled so that it is possible to renegotiate quotas per sharing operator dynamically or semi-statically.

Some embodiments can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. Embodiments described herein can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope of the disclosure, which is limited only by the following claims.

What is claimed is:

1. A method in a base station of allocating resources of a cell served by the base station among a plurality of operators sharing the cell resources, the method comprising:

measuring cell resource utilization of each of a plurality of operators sharing the cell;

receiving from a central node serving at least the base station, a resource allocation request instructing the base station to reallocate the cell resources among the plurality of operators;
allocating cell resources among the plurality of operators according to the resource allocation request received from the central node, the allocation being configured such that cell resource utilization for an operator of the plurality of operators is allowed to exceed a corresponding cell resource utilization quota only for a specified service.

2. The method of claim 1, further comprising:
performing cell resource utilization measurements for each of the plurality of sharing operators; and
reporting the cell resource utilization measurements to the central node.

3. The method of claim 2, wherein performing cell resource utilization measurements for each of the plurality of operators includes determining cell resource utilization for each public land mobile network, PLMN, associated with a corresponding operator of the plurality of operators.

4. The method of claim 2, wherein performing cell resource utilization measurements comprises measuring, by at least one counter, at least one of uplink physical resource block usage, downlink physical resource block usage, random access channel usage, power utilization, and downlink transport block usage.

5. The method of claim 1, wherein cell resource utilization includes at least one of a hardware load and an interface signaling load.

6. The method of claim 1, wherein cell resources are allocated to a particular operator only for a predetermined set of services.

7. The method of claim 1, further comprising reporting current utilization to the central node per Public Land Mobile Network on a periodic basis as specified by a periodicity information element in one of an S1:MME CONFIGURATION UPDATE message and a LOAD REQUEST message.

8. A method in a resource allocation controller of determining a cell resource utilization of a cell of a base station, the cell being shared by a plurality of operators, the method comprising:
receiving a current cell resource utilization by each of the plurality of operators;
assigning cell resource utilization quotas per each of the plurality of operators based on cell resource utilization policies;
comparing the current cell resource utilization to the assigned cell resource utilization quotas to determine whether to initiate a cell resource utilization reallocation of cell resources among the plurality of operators; and
reallocating cell resources based on at least one cell resource utilization policy, the reallocation being configured such that cell resource utilization for an operator of the plurality of operators is allowed to exceed a corresponding cell resource utilization quota only for a specified service.

9. The method of claim 8, further comprising initiating the cell resource utilization reallocation of cell resources among the plurality of operators by transmitting a message containing the cell resource utilization reallocation on an S1 interface connecting the resource allocation controller to the base station.

10. The method of claim 8, further comprising, initiating reports to be generated by the base station of cell resource utilizations via a message that includes a Radio Access Network, RAN, sharing instruction specifying a periodicity of the reports.

11. A resource allocation controller, RAC, comprising:
a communication interface configured to receive cell resource utilizations from a base station and to transmit cell resource utilization reallocations to the base station;
a processor, the processor being configured to compare an assigned cell resource utilization quota to a cell utilization quota requested by an operator of the plurality of operators; and
a memory configured to store:
current cell resource utilization by each of a plurality of operators sharing resources of a cell;
assigned cell resource utilization quotas per each of the plurality of operators based on cell resource utilization policies; and
the memory further configured to contain instructions executable by the processor to configure the processor to:
compare current cell resource utilization to assigned cell resource utilization quotas to determine whether to initiate a cell resource utilization reallocation of cell resources among the plurality of operators, the reallocation being configured such that cell resource utilization for an operator of the plurality of operators is allowed to exceed a corresponding cell resource utilization quota only for a specified service.

12. The RAC of claim 11, wherein the cell resource utilization reallocations are based on a cell resource utilization policy that specifies a change in an allocation of cell resources to an operator in one cell when a change in cell resource utilization by the operator occurs in another cell.

13. The RAC of claim 11, wherein the processor is further configured to reallocate cell resources based on an indication that an operator of the plurality of operators has excess capacity.

14. A resource allocation controller, RAC, comprising:
a communication interface configured to receive cell resource utilizations from a base station and to transmit cell resource utilization reallocations to the base station;
a processor, the processor being configured to reallocate cell resources based on a determination of unused cell resources;
a memory configured to store:
current cell resource utilization by each of a plurality of operators sharing resources of a cell;
assigned cell resource utilization quotas per each of the plurality of operators based on cell resource utilization policies; and
the memory further configured to contain instructions executable by the processor to configure the processor to:
compare current cell resource utilization to assigned cell resource utilization quotas to determine whether to initiate a cell resource utilization reallocation of cell resources among the plurality of operators, the reallocation being configured such that cell resource utilization for an operator of the plurality of operators is allowed to exceed a corresponding cell resource utilization quota only for a specified service.

15. The RAC of claim 14, wherein the RAC is located in a mobile management entity, MME, and the current cell resource utilization is measured at a base station remote from the RAC, and communicated to the RAC on a long term evolution, LTE, S1 interface.

16. The RAC of claim 14, wherein the RAC is located in a domain manager and receives current cell resource utilizations on an Operation, Administration and Maintenance, OAM, interface.

17. The RAC of claim 14, wherein the current cell resource utilizations are communicated from the base station to the RAC via a CONFIGURATION UPDATE message.

18. The RAC of claim 17, wherein the CONFIGURATION UPDATE message includes information elements that specify current cell resource utilization of at least one public land mobile network, PLMN, associated with a corresponding operator of the plurality of operators.

19. A resource allocation controller, RAC, comprising:
a communication interface module configured to receive cell resource utilizations from a base station serving a cell having resources shared by a plurality of operators and to transmit cell resource utilization reallocations to the base station;
a cell resource utilization quota assignment module configured to assign cell resource utilization quotas per each of the plurality of operators based on cell resource utilization policies;
a cell resource utilization comparison module configured to compare current cell resource utilization to assigned cell resource utilization quotas to determine whether to initiate a cell resource utilization reallocation of cell resources among the plurality of operators; and
a processor configured to:
reallocate cell resources based on at least one cell resource utilization policy, the reallocation being configured such that cell resource utilization for an operator of the plurality of operators is allowed to exceed a corresponding cell resource utilization quota only for a specified service.

20. A base station serving a cell and configured for communication with a central node, the base station comprising:
a communication interface configured to receive cell resource utilization quotas from the central node and to transmit cell resource utilizations to the central node;
a processor; and
a memory configured to store:
measured cell resource utilizations; and
assigned cell resource utilization quotas;
the memory further configured to contain instructions executable by the processor to configure the processor to:
measure cell resource utilizations of a plurality of operators sharing cell resources;
allocate cell resources among the plurality of operators according to cell resource utilization quotas;
receive assigned cell resource utilization quotas from a resource allocation controller and to report measured cell resource utilizations to the resource allocation controller;
receive assigned cell resource utilization quotas from a resource allocation controller and to report measured cell resource utilizations to the resource allocation controller;
renegotiate allocation quotas based on requests for cell resources from at least one of a plurality of operators, the renegotiated allocation quotas being based on at least one cell resource utilization policy.

21. A base station serving a cell and configured for communication with a central node, the base station comprising:
a performance measurement module configured to measure cell resource utilization of each of a plurality of operators sharing the cell, cell resource utilization including S1 interface signaling load per operator; and
a cell resource allocation module configured to allocate cell resources among the plurality of sharing operators according to cell resource utilization quotas;
a communication interface module to receive assigned cell resource utilization quotas from a resource allocation controller and to report measured cell resource utilizations to the resource allocation controller; and
a quota renegotiation module configured to reallocate cell resources based on:
requests for cell resources from at least one of the plurality of operators; and
at least one cell resource utilization policy; and
the reallocation being configured such that cell resource utilization for an operator of the plurality of operators is allowed to exceed a corresponding cell resource utilization quota only for a specified service.

22. The base station of claim 21, wherein the reallocation is such that cell resource utilization for each operator of the plurality of operators is allowed to exceed a respective cell resource utilization quota until there are no spare cell resources.

23. The base station of claim 21, wherein the reallocation is such that cell resource utilization for an operator of the plurality of operators is allowed to exceed a corresponding cell resource utilization quota by a maximum amount.

* * * * *